(12) United States Patent
Yang (10) Patent No.: US 11,325,249 B2
(45) Date of Patent: May 10, 2022

(54) MODULAR ROBOT CONTROL METHOD AND SYSTEM

(71) Applicant: Beijing KEYi Technology Co., Ltd., Beijing (CN)

(72) Inventor: Jianbo Yang, Beijing (CN)

(73) Assignee: Beijing KEYi Technology Co., Ltd., Beijing (CN)

( * ) Notice: Subject to any disclaimer, the term of this patent is extended or adjusted under 35 U.S.C. 154(b) by 0 days.

(21) Appl. No.: 16/905,904

(22) Filed: Jun. 18, 2020

(65) Prior Publication Data

US 2021/0347043 A1    Nov. 11, 2021

Related U.S. Application Data

(63) Continuation of application No. PCT/CN2018/121436, filed on Dec. 17, 2018.

(30) Foreign Application Priority Data

Dec. 19, 2017 (CN) .......................... 201711377451.7

(51) Int. Cl.
*B25J 9/16* (2006.01)
*B25J 9/08* (2006.01)

(52) U.S. Cl.
CPC .............. *B25J 9/1617* (2013.01); *B25J 9/08* (2013.01); *B25J 9/1605* (2013.01); *B25J 9/1671* (2013.01)

(58) Field of Classification Search
CPC . B25J 9/08; B25J 9/1605; B25J 9/1612; B25J 9/1617; B25J 9/1656; B25J 9/1671; B25J 13/00; G05B 2219/31075; G05B 2219/40304
See application file for complete search history.

(56) References Cited

U.S. PATENT DOCUMENTS

| | | | |
|---|---|---|---|
| 2003/0040249 A1 | 2/2003 | Yim et al. | |
| 2003/0040250 A1* | 2/2003 | Yim ...................... | A63H 33/04 446/91 |
| 2006/0100739 A1* | 5/2006 | Raffle ...................... | B25J 9/08 700/245 |
| 2012/0122059 A1* | 5/2012 | Schweikardt .......... | G09B 23/00 434/118 |

(Continued)

FOREIGN PATENT DOCUMENTS

| | | |
|---|---|---|
| CN | 104326031 A | 2/2015 |
| CN | 204315156 U | 5/2015 |

(Continued)

*Primary Examiner* — Dale Moyer
(74) *Attorney, Agent, or Firm* — Andrew C. Cheng (57) ABSTRACT

The present disclosure relates to the field of modular robot control, and more particularly to a method for controlling a modular robot and a system thereof. The method includes the following steps: T1: providing a plurality of module units; T2: assembling the plurality of module units into an initial entity structure; T3: acquiring initial virtual configuration information of the initial entity structure; T4: generating an initial virtual configuration based on the initial virtual configuration information; T5: setting an action frame to generate preset action control information; and T6: transmitting the preset action control information to the modular robot which executes a motion according to the preset action control information.

10 Claims, 6 Drawing Sheets

(56) References Cited

U.S. PATENT DOCUMENTS

| | | | | |
|---|---|---|---|---|
| 2013/0183882 A1* | 7/2013 | Oschuetz | ............ | A63H 33/042 |
| | | | | 446/90 |
| 2014/0222198 A1* | 8/2014 | Emami | ...................... | B25J 9/08 |
| | | | | 700/250 |
| 2014/0273730 A1* | 9/2014 | Brandwijk | ................. | B25J 9/08 |
| | | | | 446/484 |
| 2016/0005331 A1* | 1/2016 | Ryland | ...................... | F16H 1/12 |
| | | | | 434/118 |
| 2016/0310861 A1* | 10/2016 | Hirata | .................... | A63F 13/327 |
| 2017/0282089 A1* | 10/2017 | Wang | ........................ | G09B 5/00 |
| 2020/0269417 A1* | 8/2020 | Riek | .................... | B25J 19/0004 |
| 2020/0306978 A1* | 10/2020 | Riek | ...................... | B25J 9/1664 |

FOREIGN PATENT DOCUMENTS

| | | |
|---|---|---|
| CN | 106272550 A | 1/2017 |
| CN | 106945036 A | 7/2017 |
| CN | 107225565 A | 10/2017 |
| CN | 108326841 A | 7/2018 |
| CN | 108326846 A | 7/2018 |
| CN | 108356806 A | 8/2018 |
| GB | 2533314 A | 6/2016 |

* cited by examiner

MODULAR ROBOT CONTROL METHOD AND SYSTEM

TECHNICAL FIELD

The present disclosure relates to the field of modular robot control, and more particularly to a method for controlling a modular robot and a system thereof.

BACKGROUND

Robots have been widely used in life and industry, e.g., used for training students' creative thinking skills in teaching and used for welding, spraying, assembling, carrying and other operations in automated production. Although as an execution system, a robot has great flexibility to complete different work tasks, an existing robot often has only one main function for specific use purposes and occasions due to fixed freedom degree and configuration and lack of functional scalability and re-configurability. In addition, it is very expensive to develop a specific robot for each field and each application, which severely restricts the popularization and application of robots. Therefore, a reconfigurable robot comes into being.

The reconfigurable robot is generally obtained by combining a main module and a plurality of basic modules. The plurality of basic modules have the same structure, and they are all equipped with one or a plurality of connecting surfaces to realize the combination of each other. However, the user cannot verify whether the combined structure is correct during the process of combining the basic modules, which brings a lot of repetitive assembly work to the user, causing very poor use experience.

SUMMARY

In view of the above problems, the present disclosure provides a modular robot and a position calculation method for module units of the modular robot.

A technical solution of the present disclosure for solving the technical problems is to provide a method for controlling a modular robot, wherein the method comprises the following steps:

T1: providing a plurality of module units;
T2: assembling the plurality of module units into an initial entity structure;
T3: acquiring initial virtual configuration information of the initial entity structure;
T4: generating an initial virtual configuration based on the initial virtual configuration information;
T5: setting an action frame to generate preset action control information; and
T6: transmitting the preset action control information to the modular robot which executes a motion according to the preset action control information.

Preferably, each of the module units comprises two sub-modules that are rotatable relative to each other, and step T5 specifically includes the following sub-steps:

T51: controlling the two sub-modules of one or more module units to rotate relative to each other to generate one or more motion frames;
T52: storing the one or more motion frames; and
T53: generating preset action control information according to the one or more motion frames.

Preferably, step T51 includes the two sub-modules of the one or more module units in the initial entity structure are controlled to rotate relative to each other, or the two sub-modules of the one or more module units in the initial virtual configuration are controlled to rotate relative to each other.

Preferably, step T53 specifically includes adding, deleting or editing the one or more motion frames to generate the preset action control information.

Preferably, the step of editing the action frame further includes editing one or more of a rotation time, a rotation speed, a rotation angle and a rotation direction.

Preferably, the initial virtual configuration information includes one or more of module type information, module quantity information, location information, and initial angle information between the two sub-modules, of the plurality of module units.

Preferably, the plurality of module units is capable of comprising a plurality of identical or different module units; each of the module units comprises two sub-modules that are movable relative to each other; each of the sub-modules comprises at least one butting portion; each of the butting portions has unique interface identification information; and acquiring the location information of the plurality of module units of the initial entity structure specifically includes: recognizing, by a module unit, the interface identification information of the butting portion of an adjacent module unit connected to the module unit, and acquiring the location information of the module unit according to the interface identification information of the butting portion of the adjacent module unit and the interface identification information of the butting portion of the module unit per se for connecting the adjacent module unit.

Preferably, the plurality of module units comprises at least one module unit capable of communicating with a remote terminal; when the plurality of module units comprises a plurality of different module units, the plurality of module units comprise a main cell body and at least one single cell body; the module unit communicating with the remote terminal is defined as the main cell body; the single cell body directly connected to the main cell body is defined as a first-level single cell body; and acquiring the location information of the plurality of module units of the initial entity structure specifically comprises the following sub-steps:

T31: transmitting a signal by the main cell body to the first-level single cell body connected thereto via the butting portion; and
T32: receiving the signal and then performing face recognition by the first-level single cell body to obtain the interface identification information of the butting portion where the main cell body transmits the signal, and transmitting the interface identification information of the butting portion where the main cell body transmits the signal together with the interface identification information of the butting portion where the first-level single cell body per se receives the signal to the main cell body by the first-level single cell body, so as to obtain the location information of the first-level single cell body.

Preferably, the single cell body connected to the first-level single cell body is defined as a second-level single cell body; the single cell body connected to an $M^{th}$-level single cell body is defined as a $(M+1)^{th}$-level single cell body, M being an integer greater than or equal to 1; and acquiring the location information of the plurality of module units of the initial entity structure further comprises the following sub-steps:

T33: sending a signal to the $(M+1)^{th}$-level single cell body by the $M^{th}$-level single cell body;
T34: receiving the signal and then performing face recognition by the $(M+1)^{th}$-level single cell body to obtain the interface identification information of the butting portion where the $M^{th}$-level single cell body transmits the signal, and transmitting the interface identification information of the butting portion where the $M^{th}$-level single cell body transmits the signal together with the interface identification information of the butting portion where the $(M+1)^{th}$-level single cell body receives the signal to the main cell body by the $(M+1)^{th}$-level single cell body.

Preferably, when the main cell body or the single cell body sends different electrical signals simultaneously to a plurality of subordinate-level single cell bodies, the plurality of subordinate-level single cell bodies responds to the main cell body with the location information of the subordinate-level single cell bodies in a time-sharing sequence according to the interface identification information of the butting portion where the main cell body or an supervisor-level single cell body sends the different electrical signals; or, when the main cell body or the single cell body sends identical or different electrical signals to the plurality of subordinate-level single cell bodies in a time-sharing sequence, the plurality of subordinate-level single cell bodies responds to the main cell body with the location information of the subordinate-level single cell bodies successively according to a time sequence in which the electrical signals are received.

Preferably, each single cell body monitors relative angle information between the two sub-modules of the single cell body in real time during the execution of an action, and judges whether the action is completely executed according to a detection result.

A system for controlling a modular robot, wherein the system is configured to control an initial entity structure assembled from a plurality of module units, and includes a storage module configured to store initial virtual configuration information of the initial entity structure; a configuration generation module configured to generate an initial virtual configuration of the modular robot according to the initial virtual configuration information; an action generation module configured to generate preset action control information; and a transmission module configured to transmit the preset action control information to the modular robot so that the modular robot performs an execution according to the preset action control information.

Another technical solution of the present disclosure for solving the technical problems is to provide a system for controlling a modular robot, wherein the system includes a modular robot which is assembled from a plurality of module units and has an initial entity structure; a memory and one or more programs, wherein the one or more programs are stored in the memory, the memory communicates with the module units, and the one or more programs are configured to execute the following step instructions:

acquiring and storing initial virtual configuration information of the initial entity structure;

generating an initial virtual configuration of the modular robot according to the initial virtual configuration information;

setting an action frame to generate preset action control information; and transmitting the preset action control information to the modular robot.

Preferably, the plurality of module units comprises a main cell body and at least one single cell body; each butting portion has unique interface identification information; the single cell body directly connected to the main cell body is defined as a first-level single cell body; and acquiring the initial virtual configuration information of the initial entity structure comprises the following steps:

transmitting a signal by the main cell body to the first-level single cell body connected thereto via the butting portion; and receiving the signal and then performing face recognition by the first-level single cell body to obtain the interface identification information of the butting portion where the main cell body transmits the signal, and transmitting the interface identification information of the butting portion where the main cell body transmits the signal together with the interface identification information of the butting portion where the first-level single cell body per se receives the signal to the main cell body by the first-level single cell body, so as to obtain the location information of the first-level single cell body.

Compared with the prior arts, the method for controlling a modular robot includes the following steps: T1: providing a plurality of module units; T2: assembling the plurality of module units into an initial entity structure; T3: acquiring initial virtual configuration information of the initial entity structure; T4: generating an initial virtual configuration based on the initial virtual configuration information; T5: setting an action frame to generate preset action control information; and T6: transmitting the preset action control information to the modular robot which executes a motion according to the preset action control information. The method for controlling a modular robot of the present invention allows users to assemble the configuration at will and programming the control information for controlling the modular robot to perform actions, which greatly improves the convenience for the user of the modular robot, and increases the design space of the modular robot to make it suitable for more using scenes.

In addition, one or more of the rotation time, rotation speed, rotation angle and rotation direction of the motion frame can be edited, and various parameters can be adjusted for the control motion information, which further increases the design space of the modular robot.

In addition, in this method, the position of each module unit can be accurately obtained through face recognition, which is simple, fast and has low hardware requirements.

The system of a control method for a modular robot of the present disclosure also has the above-mentioned advantages.

DETAILED DESCRIPTION

In order to make the objectives, technical solutions, and advantages of the present disclosure clearer, the present disclosure is further described in detail below with reference to the accompanying drawings and embodiments. It should be understood that the specific embodiments described herein are only used to explain the present disclosure and are not used to limit the present disclosure.

Embodiment 1

Figure 1:
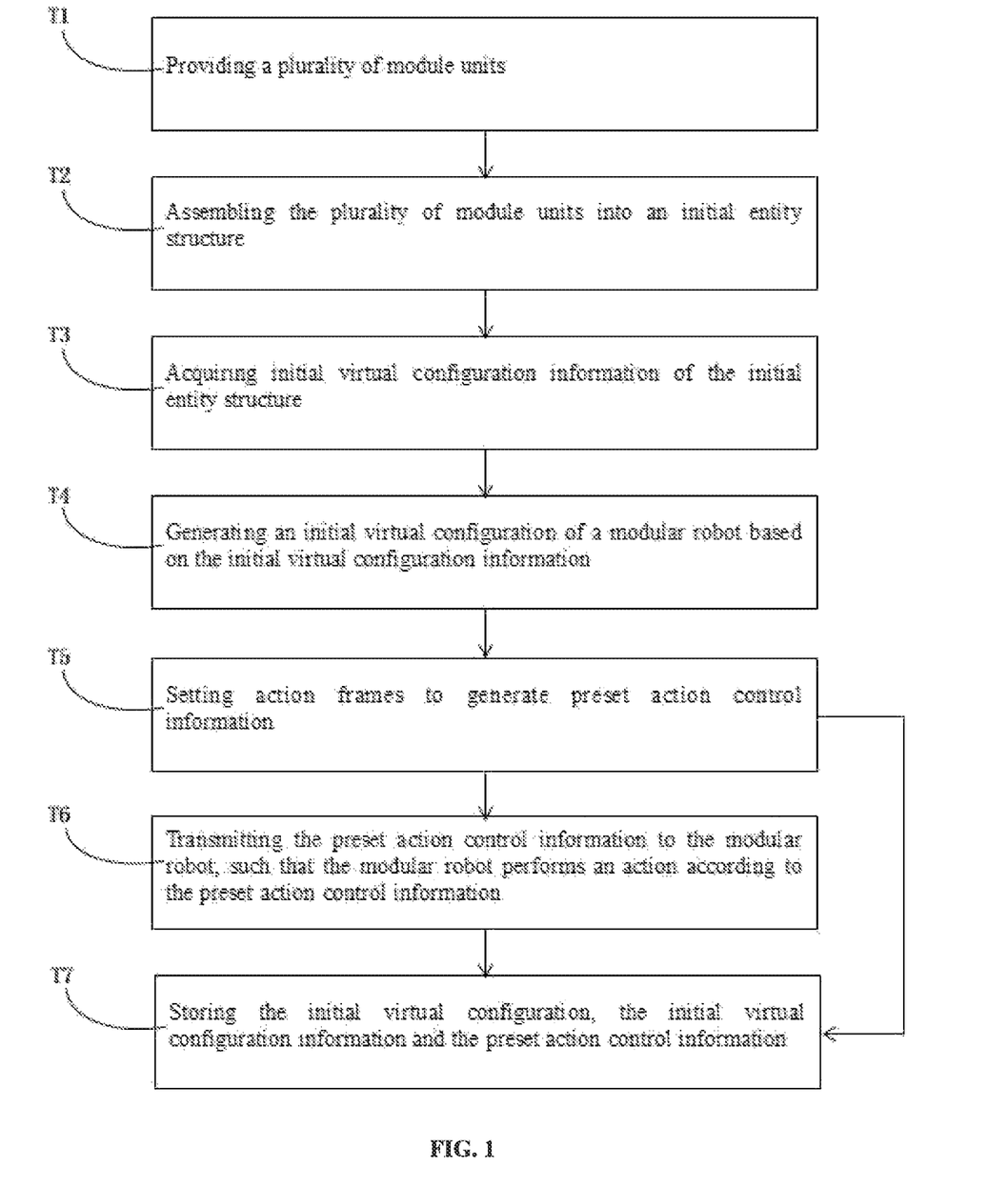
FIG. 1 is a schematic flowchart of a control method for a modular robot according to a fifth embodiment of the present disclosure.

Referring to FIG. 1, the first embodiment of the present disclosure further provides a control method for a modular robot. The modular robot includes at least two module units, each module unit including two sub-modules that are movable relatively. For example, the two sub-modules are rotatable relatively. Preferably, each module unit is composed of an upper hemisphere and a lower hemisphere that are rotatable relatively. Each sub-module includes at least one docking part, wherein each docking part is provided with an interface, each interface having unique interface identification information. The module units are connected by docking parts. It may be understood that when each sub-module includes at least two docking parts, the two module units are connected by one docking part of one of the two module units and one docking part of the other of the two module units to form a virtual connection surface at the connection of the two module units. The two module units can rotate based on the virtual connection surface. A plane where at least another docking part on at least one of the two module units is located intersects with said virtual connection surface.

For the sake of the subsequent explanation and understanding, the following definitions are made here. Configuration information includes but is not limited to one or more of module type information, position information, module quantity information, and initial angle information between two sub-modules. The configuration information is configured to define a connection relationship between adjacent module units. The position information is configured to record interface identification information of the two docking parts by which the adjacent module units are connected, the interface identification information of each docking part representing a position of said docking part on the module unit where it is located. Therefore, the position information of each module unit represents its absolute position in a three-dimensional spatial configuration or planar configuration. Module units of the same type are set with the same module type identifier. For example: the cell bodies have the same module type identifier, and the single cell bodies have the same module type identifier, the module type identifier of the cell bodies being inconsistent with the module type identifier of the single cell bodies. When there is a plurality of types of single cell bodies, each type of single cell bodies has the same module type identifier, and different types of single cell bodies have different module type identifiers, such that the module type information of the module units can be obtained by recognizing the module type identifiers. The initial angle information between two sub-modules refers to a relative angle value between upper and lower sub-modules in each module unit. The module quantity information refers to the quantity of the module units. The process of recognizing the interface identification information of two docking parts by which two adjacent module unit are connected to each other between the two adjacent module units refers to a process of face recognition, and the position information of the module units can be obtained by performing the face recognition. It may be understood that the definitions here are also applicable to other embodiments of this specification.

The control method for the modular robot includes the following steps:

T1: providing a plurality of module units;

T2: assembling the plurality of module units into an initial entity structure;

T3: acquiring initial virtual configuration information of the initial entity structure;

T4: generating an initial virtual configuration of the modular robot based on the initial virtual configuration information;

T5: setting action frames to generate preset action control information; and

T6: transmitting the preset action control information to the modular robot, such that the modular robot performs an action according to the preset action control information.

It may be understood that, in the step T1, the plurality of provided module units may include at least one module unit that communicates with a remote terminal, thereby achieving the communication between the modular robot and the remote terminal. In addition, when the modular robot itself can perform the operations of the subsequent steps without communicating with the remote terminal, the plurality of provided module units include at least one module unit that can perform the subsequent steps.

It may be understood that in the step T2, a plurality of module units is assembled into a modular robot, and the specific structure of the modular robot is the initial entity structure.

It may be understood that in the step T3, the initial entity structure may be uploaded to the remote terminal to acquire the initial virtual configuration information of the initial entity structure. At least one module unit uploads the initial entity structure of the assembled modular robot to the remote terminal. The remote terminal obtains the initial virtual configuration information of the initial entity structure; or at least one of the plurality of module units acquires the initial virtual configuration information of the initial entity structure and stores the initial virtual configuration information, instead of transmitting the initial virtual configuration information to the remote terminal. The initial virtual configuration information includes one or more of position information, module type information, module quantity information, initial angle information between upper and lower sub-modules, and other information that defines a connection relationship between adjacent module units. Each module unit transmits its own module type information to the cell body wirelessly. After all the module units transmit their position information to the remote terminal, the remote terminal obtains the module quantity information of the initial entity structure. Each module unit detects the initial angle of the upper and lower sub-modules thereof and wirelessly transmits the initial angle information to the remote terminal.

Figure 2:
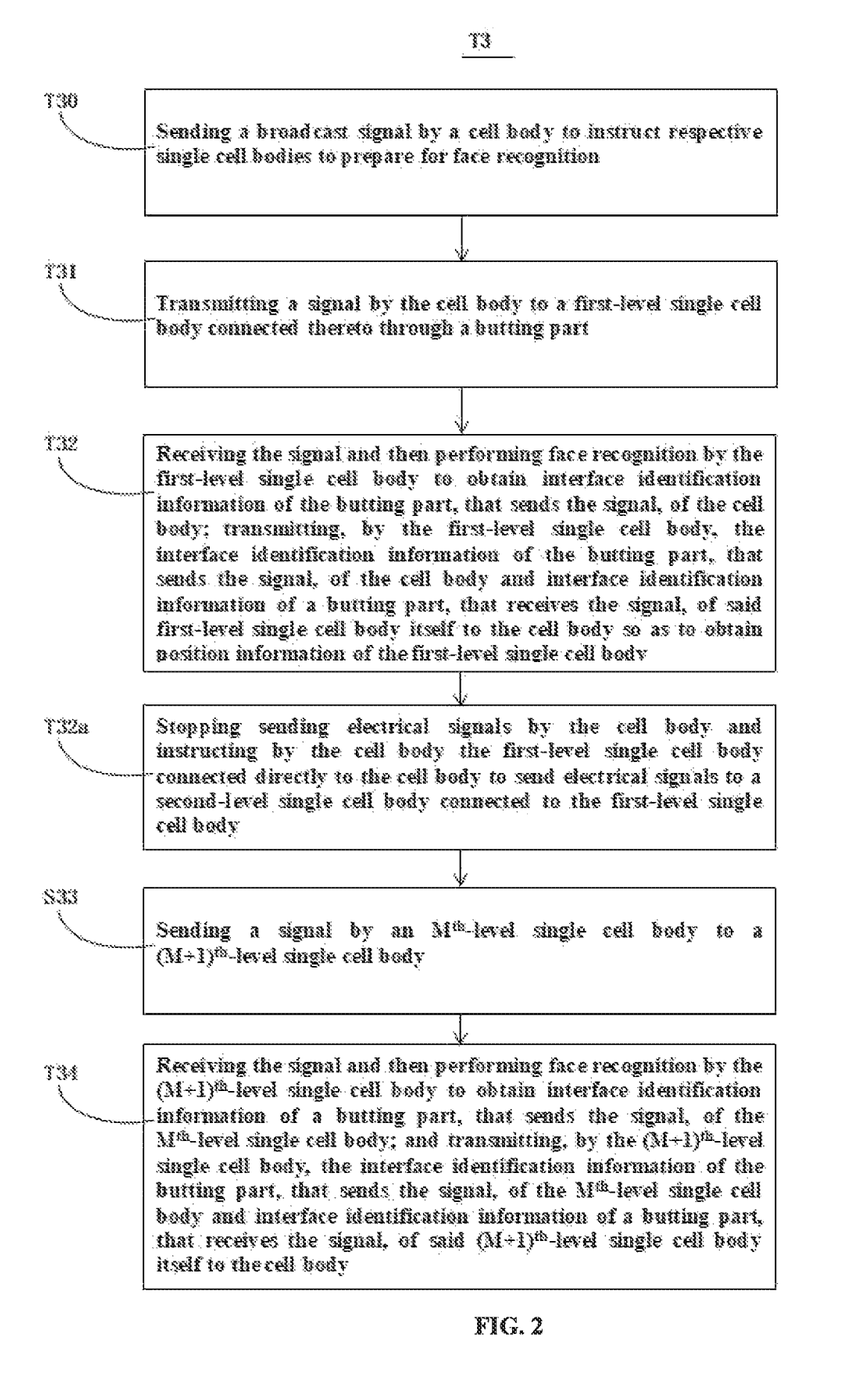
FIG. 2 is a schematic sub-flowchart of step T3 in the control method for the modular robot according to the fifth embodiment of the present disclosure.

Referring to FIG. 2, the plurality of module units of the initial entity structure may include a plurality of same or different module units. The plurality of module units includes at least one module unit that can communicate with the remote terminal. When the plurality of module units of the initial entity structure includes a plurality of different module units, for example, the plurality of module units includes a cell body and at least one single cell body, the cell body is configured to communicate with the remote terminal, the single cell body directly connected to the cell body is defined as a first-level single cell body, the single cell body connected to the first-level single cell body is defined as a second-level single cell body, and the single cell body connected to an $M^{th}$-level single cell body is defined as a $(M+1)^h$-level single cell body, M being an integer greater than or equal to 1. Acquiring the initial virtual configuration information of the initial entity structure includes the following steps:

T31: transmitting a signal by the cell body to the first-level single cell body connected thereto through the docking part;

T32: receiving the signal and then performing face recognition by the first-level single cell body to obtain the interface identification information of the docking part, that sends the signal, of the cell body; transmitting, by the first-level single cell body, the interface identification information of the docking part, that sends the signal, of the cell body and the interface identification information of the docking part, that receives the signal, of said first-level single cell body itself to the cell body so as to obtain position information of the first-level single cell body;

T33: sending a signal by the $M^{th}$-level single cell body to the $(M+1)^{th}$-level single cell body; and T34: receiving the signal by and then performing face recognition the $(M+1)^{th}$-level single cell body to obtain the interface identification information of the docking part, that sends the signal, of the $M^{th}$-level single cell body; and transmitting, by the $(M+1)^{th}$-level single cell body, the interface identification information of the docking part, that sends the signal, of the $M^h$-level single cell body and the interface identification information of the docking part, that receives the signal, of said $(M+1)^b$-level single cell body itself to the cell body.

It may be understood that the signal transmitted from the cell body to the first-level single cell body and the signal transmitted from the $M^{th}$-level single cell body to the $(M+1)^{th}$-level single cell body are preferably electrical signals or wireless signals. When the initial entity structure includes only the cell body and the first-level single cell body, the steps T33 and T34 may be omitted.

When the plurality of module units of the initial entity structure includes a plurality of same module units, one of the module units is defined as a main module unit, i.e., the above-mentioned cell body; the module unit directly connected to the main module unit is defined as a first-level single cell body, the module unit connected to the first-level single cell body is defined as a second-level single cell body, and the module unit connected to the $M^{th}$-level single cell body is defined as the $(M+1)^{th}$-level single cell body, M being an integer greater than or equal to 1, the above steps S31 to T34 are also performed. As a variant, a plurality of levels of single cell bodies may directly transmit their respective position information to the remote terminal, without having to transmit them to the main module unit.

In summary, the process of acquiring the position information of the plurality of module units of the initial entity structure is described as follows: each module unit recognizes the interface identification information of the docking part of the adjacent module unit connected thereto, and obtains its position information based on the interface identification information of the docking part of the adjacent module unit and the interface identification information of the docking part by which said module unit itself is connected to the adjacent module unit.

In addition, the following step is performed before or at the same time with step T31.

In the step T30: sending, by the cell body, a broadcast signal for instructing the respective single cell bodies to prepare for face recognition. It may be understood that wireless communication may be performed between module units. The wireless communication may be wifi communication, Bluetooth communication, or zigbee communication, preferably zigbee communication. The cell body first instructs respective single cell bodies to enter a face recognition preparation state in a form of broadcast signals, and then performs the face recognition action after the respective single cell bodies receive electrical signals.

In the step T31, each docking part on the cell body sends different electrical signals to a plurality of first-level single cell bodies. In the step S32, the plurality of first-level single cell bodies obtains interface identification information of the docking parts of the cell body connected thereto according to the received different electrical signals. Each first-level single cell body responds to the cell body with the interface identification information of the docking part, that transmits the electrical signals, of the cell body and the interface identification information of the docking part, that receives the electrical signals, of said first-level single cell body itself. The cell body calculates the position information of this first-level single cell body through an algorithm. After the plurality of first-level single cell bodies performs the same action, the cell body obtains position information of the plurality of first-level single cell bodies. In the same way, in the steps T33 and T34, each docking part on the $M^{th}$-level single cell bodies sends different electrical signals to a plurality of $(M+1)^{th}$-level single cell bodies. The plurality of $(M+1)^{th}$-level single cell bodies obtains interface identification information of the docking parts of the $M^{th}$-level single cell bodies connected thereto according to the received different electrical signals. Each $(M+1)^{th}$-level single cell body responds to the cell body with the interface identification information of the docking part, that transmits the electrical signals, of the $M^{th}$-level single cell body and the interface identification information of the docking part, that receives the electrical signals, of said $(M+1)^{th}$-level single cell body itself. The cell body calculates the position information of this $(M+1)^{th}$-level single cell body through an algorithm. After the plurality of $(M+1)^{th}$-level single cell bodies perform the same action, the cell body obtains position information of the plurality of $(M+1)^{th}$-level single cell bodies. After a series of face recognition, the cell body obtains the position information of all single cell bodies, thereby obtaining the configuration information of the initial entity structure.

It may be understand that, when the cell body or single cell body simultaneously sends different electrical signals to a plurality of lower-level single cell bodies, the plurality of lower-level single cell bodies responds to the cell body with their position information in a time sequence according to the interface identification information of the docking parts, that transmit different electrical signals, of the cell body or the higher-level single cell body; or when the cell body or single cell body sends the same or different electrical signals to a plurality of lower-level single cell bodies in a time sequence, the plurality of lower-level single cell bodies sequentially responds to the cell body with their position information according to a time sequence in which the electrical signals are received. For example: when the cell body is provided with two docking parts, the interface identification information is defined as 1 and 2, respectively, and the cell body simultaneously sends two different electrical signals to the two first-level single cell bodies connected thereto, it is set that the first-level single cell body connected to a docking part 1 first makes a response with its position information, and after a wait of 10 s (the specific time may be adjusted), the first-level single cell body connected to a docking part 2 makes a response with its position information.

In addition, there is a step between the steps T32a and T33a, step S32a: stopping sending the electrical signals by the cell body, and instructing by the cell body the first-level single cell body connected directly to the cell body to send electrical signals to the second-level single cell body connected to the first-level single cell body. It may be understood that, in the step S22a, the cell body preferably instructs the first-level single cell bodies in a form of broadcast signals. It may also be understood that before the $M^{th}$-level single cell body sends the electrical signals, the cell body controls the $M^{th}$-level single cell body to send electrical signals to a plurality of $(M+1)^{th}$-level single cell bodies based on a time sequence in a form of broadcast signals according to the interface identification information of a plurality of docking parts of the $M^{th}$-level single cell body. The electrical signals sent by the $M^{th}$-level single cell bodies to the plurality of $(M+1)^{th}$-level single cell bodies may be the same or different, and it is preferable that the plurality of docking parts of each $M^{th}$-level single cell body sends different electrical signals.

In addition, in the steps T32 and T34, after receiving the position information transmitted from the single cell bodies, the cell body individually numbers the respective single cell bodies, and stores the position information of each single cell body in association with the corresponding number. When the cell body communicates with the remote terminal, the cell body transmits the position information of each single cell body and its number to the remote terminal. After the remote terminal sends action control information to the cell body, the cell body decomposes the control information according to different numbers and correspondingly transmits the decomposed control information to the respective single cell bodies according to the numbers.

It may be understood that, in the step T4, the remote terminal or the module unit in which the initial virtual configuration information in the step T3 is stored generates an initial virtual configuration of the modular robot according to the initial virtual configuration information. The remote terminal generates the initial virtual configuration of the modular robot through three-dimensional simulation or three-dimensional modeling according to the obtained initial virtual configuration information.

Figure 3:
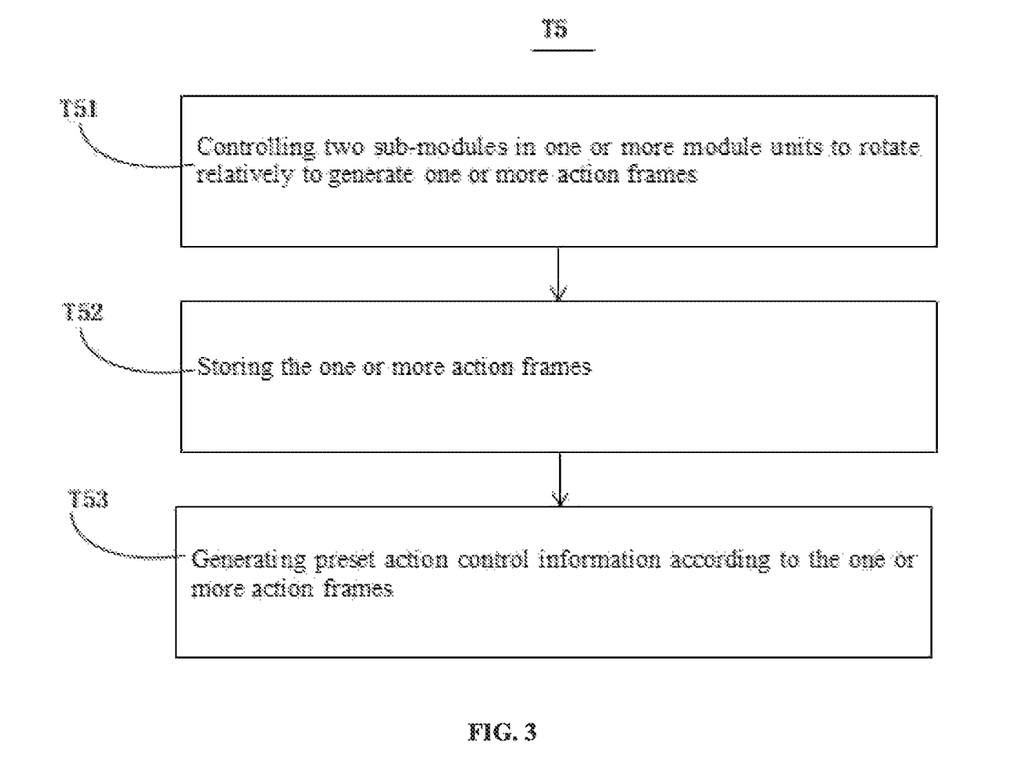
FIG. 3 is a schematic sub-flowchart of step T5 in the control method for the modular robot according to the fifth embodiment of the present disclosure.

Referring to FIG. 3, the step T5 specifically includes the following steps:

T51: controlling two sub-modules in one or more module units to rotate relatively to generate one or more action frames;

T52: storing the one or more action frames; and

T53: generating preset action control information according to the one or more action frames.

It may be understood that, in the steps T51 and T52, controlling the two sub-modules in one or more module units to rotate relatively may be performed in the initial entity structure, or may be performed in the initial virtual configuration. For example, two sub-modules of one single cell body may be controlled to rotate relatively by a certain angle on the entity configuration of the modular robot. This single cell body may detect a relative rotation angle value of the two sub-modules and transmit it to the cell body. The cell body transmits this angle value, together with the number of this single cell body and/or the position information of this single cell body to the remote terminal. The remote terminal determines an identity of this single cell body according to the number of this single cell body and/or the position information of this single cell body, retrieves the initial angle information of the two sub-modules of this single cell body, calculates the relative angle information between the two sub-modules after the rotation in combination with this rotation angle value, and saves the process from the initial angle position to the current angle position as an action frame. Two sub-modules of another single cell body are then rotated, or two sub-modules of the same single cell body are continuously rotated. After the same information transmission and calculation processing, the remote terminal saves this process as another action frame, thereby forming a plurality of action frames. Also for example: two sub-modules in one or more module units may be chosen from the initial virtual configuration of the modular robot generated by the remote terminal to rotate by a certain angle and this process is saved as an action frame; and another single cell body or the same single cell body is continuously selected to rotate by a certain angle to form another action frame, thereby obtaining a plurality of action frames.

It may be understood that the step T53 is specifically as follows:

adding, deleting or editing one or more action frames to generate the preset action control information. It may be understood that, in the remote terminal, one or more of a rotation time, a rotation speed, a rotation angle, and a rotation direction of each action frame may be edited. For example: one or more action frames may be selected on an operation interface of the remote terminal. After one of the action frames is selected, it is possible to edit one or more parameters of the rotation angle, the rotation direction, the rotation time, and the rotation speed of this action frame. Alternatively, it is also possible to edit the sequence of the plurality of action frames to finally generate the preset action control information.

In the step T6, after the remote terminal transmits the preset action control information to the cell body, the cell body decomposes the preset action control information according to the numbers of different single cell bodies, and transmits part of the decomposed preset action control information to the corresponding single cell body according to different numbers. The single cell body performs actions after receiving the part of the preset action control information. It may be understood that the single cell body monitors the relative angle information between its two sub-modules in real time during the execution of the actions, and determines whether the action is completed according to the detection result. Preferably, after the single cell body determines that the actions are completed, the single cell body transmits a signal to the cell body. The cell body transmits the signal to the remote terminal to inform the single cell body that the action shave been completed; or the single cell body directly transmits the signal to the remote terminal.

Referring to FIG. 1 again, the control method for the modular robot further includes the following step:

T7: storing the initial virtual configuration, the initial virtual configuration information and the preset action control information. After the preset action control information is generated, the initial virtual configuration, the initial virtual configuration information and the preset action control information are associatively stored in a database, and assembly may be performed based on the initial virtual configuration stored in the database. The assembled configuration is compared with the initial virtual configuration stored in the database, and corrected. When configuration information of the assembled configuration is consistent with the initial virtual configuration information stored in the database, the corresponding associated preset action control information can be directly retrieved from the database to execute an action; or when enough initial virtual configurations are stored in the database, configuration information of a randomly assembled configuration is matched with each piece of the initial virtual configuration information in the database. When the configuration information of the randomly assembled configuration is identical with certain initial virtual configuration information, the corresponding associated preset action control information can be directly retrieved from the database to execute an action.

Figure 4:
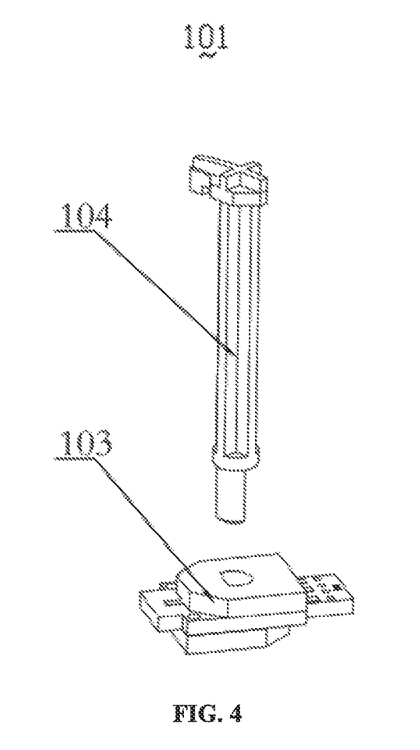
FIG. 4 is a schematic diagram of an exploded structure of an angle measurement device according to the fifth embodiment of the present disclosure.
Figure 5:
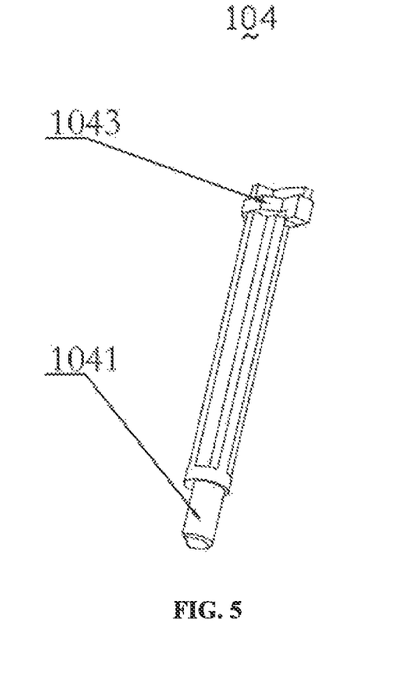
FIG. 5 is a schematic diagram of a three-dimensional structure of a rotating shaft according to the fifth embodiment of the present disclosure.

Referring to FIG. 4 and FIG. 5 together, each single cell body is provided with an angle measurement device 101, the angle measurement device 101 including a rotating shaft 104 and a sensor 103. The rotating shaft 104 includes a first end 1041 and a second end 1043 which face each other. The first end 1041 of the rotating shaft 104 is connected to the sensor 103. The second end 1043 of the rotating shaft 104 is connected to one of the sub-modules. The sensor 103 is connected to the other sub-module, so that the rotation between the two sub-modules can be detected by the sensor 103. A cross section of the first end 1041 of the rotating shaft 104 is preferably substantially "D-shaped". When being connected to the sensor 103, the rotating shaft 104 is inserted into the sensor 103 to play a foolproof role. When the rotating shaft 104 that has been removed is installed again, it needs to be installed from the same angle. The second end 1043 of the rotating shaft 104 is preferably in a pointer shape. When the rotating shaft 104 is connected to one of the sub-modules of the module unit, a foolproof effect is also achieved. When the rotating shaft 104 which has been removed is installed again, it needs to be installed from the same angle. Therefore, the sub-module connected to the rotating shaft 104 and the sensor 103 are moderately maintained at the same angle, and it is unnecessary to readjust the disassembled single cell body when it is assembled again. It may be understood that the shapes of the first end 1041 and the second end 1043 of the rotating shaft 104 are not completely limited to the shapes in the embodiment, and the first end 1041 and the second end 1043 of the rotating shaft 104 may also be other foolproof structures as long as the foolproof effect is achieved. The foolproof structure is a variant that is easily conceived by those skilled in the art, and will not be further described in this embodiment by way of example.

Figure 6:
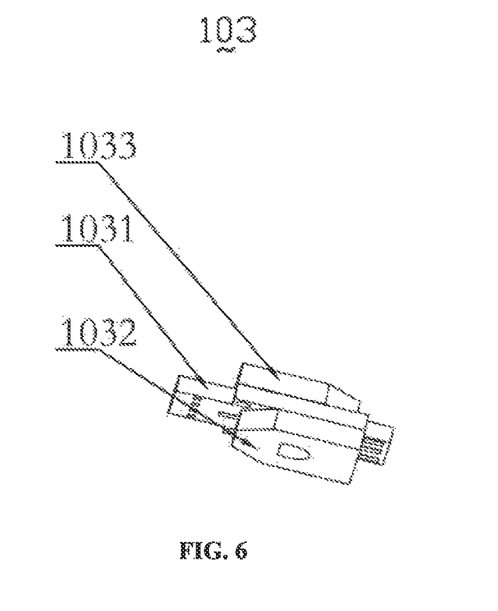
FIG. 6 is a schematic diagram of a three-dimensional structure of a sensor according to the fifth embodiment of the present disclosure.
Figure 7:
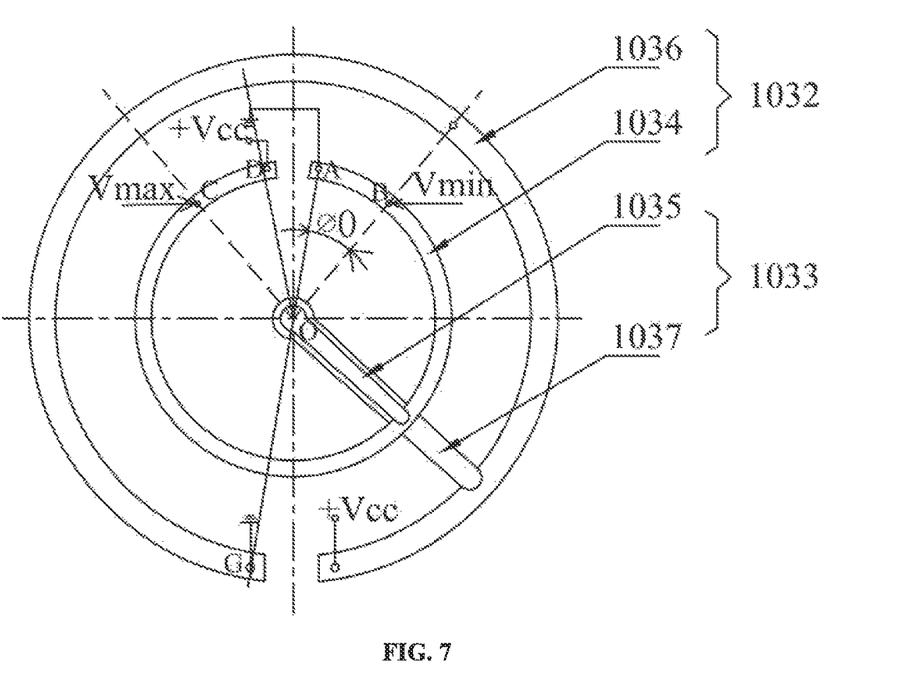
FIG. 7 is a schematic diagram of a measurement principle of the sensor according to the fifth embodiment of the present disclosure.

Referring to FIG. 6 and FIG. 7 together, the sensor 103 includes an angle measurement circuit board 1031, a first potentiometer 1032 and a second potentiometer 1033. The first potentiometer 1032 and the second potentiometer 1033 are electrically connected in parallel, and dead zones of the two potentiometers do not cover each other. The angle measurement circuit board 1031 is provided between the first potentiometer 1032 and the second potentiometer 1033. The first potentiometer 1032 and the second potentiometer 1033 are both connected to the angle measurement circuit board 1031. The first potentiometer 1032 and the second potentiometer 1033 are also electrically connected to the angle measurement circuit board 1031. The first potentiometer 1032 includes a first resistor 1034 and a first slider 1035. The second potentiometer 1033 includes a second resistor 1036 and a second slider 1037.

An end point of the first slider 1035 slides on the first resistor 1034. An end point of the second slider 1037 slides on the second resistor 1036. The first slider 1035 and the second slider 1037 are fixedly connected by an insulating material. The first slider 1035 and the second slider 1037 share one rotating shaft. That is, the first slider 1035 and the second slider 1037 are both connected to the first end 1041 of the rotating shaft 104, and rotate with the rotating shaft 104 as a center. A dead zone of the first resistor 1034 is covered by a non-dead zone of the second resistor 1036. A dead zone part of the second resistor 1036 is covered by a non-dead zone of the first resistor 1034.

Input and output ports of the first potentiometer 1032 and the second potentiometer 1033 are integrated on the angle measurement circuit board 1031. The input and output ports include ports where the resistors are connected to a voltage Vcc, a grounding port, and output ports of the sliders. It may be understood that the angle measurement circuit board 1031 may not be provided, while the first potentiometer 1032 and the second potentiometer 1033 are directly electrically connected to a main circuit board (not shown) of the single cell body, function modules of the angle measurement circuit board 1031 being integrated on the main circuit board.

In order to measure more accurately, the dead zones of the potentiometers in this embodiment of the present disclosure are defined to include two areas: 1st. an area that cannot be directly measured by a single potentiometer, that is, an area between two end points of the resistor, such as an inferior arc AOD in FIG. 7; and 2nd. an area of two sections of the single potentiometer near the end points, which has low measurement accuracy, such as an inferior arc AOB and an inferior arc COD in FIG. 7, wherein two critical endpoints B and C in the area with low measurement accuracy correspond to a minimum voltage and a maximum voltage which are output by the slider. Then, the dead zone of the first potentiometer 1032 in FIG. 7 is defined as an inferior arc BOC area.

The principle of 360-degree angle measurement of a non-dead zone angle measurement device 101 based on dual potentiometers of the present disclosure is implemented as follows:

the center of the rotating shaft shared by the two sliders is labelled as O, an end of the first resistor 1034 connected to the voltage Vcc is labelled as D, a grounding end of the first resistor 1034 is labelled as A, and a grounding end of the second resistor 1036 is labelled as G. The minimum voltage and the maximum voltage output by the first potentiometer 1032 are set as Vmin and Vmax, respectively, wherein Vmin to Vmax is an output voltage range in which the first potentiometer 1032 measures the rotation angle of the first slider 1035 with relatively high accuracy.

When the DC voltage output of the first slider 1035 is set as Vmin, a point of the first slider 1035 on the first resistor 1034 is set as B, and meanwhile a point of the second slider 1037 on the second resistor 1036 is set as F. When the DC voltage output of the first slider 1035 is set as Vmax, a point of the first slider 1035 on the first resistor 1034 is set as C, and meanwhile a point of the second slider 1037 on the second resistor 1036 is set as E.

If $\angle AOB = \phi_0$, the DC voltage output of the first slider 1035 corresponding to point C is Vmax, $$\phi_0 = \frac{V_{min}}{k_1}, \quad (2)$$

wherein, k1 is an angular voltage division coefficient of the first resistor 103411.

Moreover, a ray OBF is defined as a zero initial line for angle measurement. That is, when the first slider 1035 and the second slider 1037 coincide with the OBF, an angle $\phi$ measured at this time is defined as 0. When a voltage value V1 measured by the first slider 1035 satisfies the following formula (3):

$$V_{min} \leq V_1 \leq V_{max} \quad (3).$$

That is, when the first slider 1035 slides on a major arc BOC, the measured angle $\phi$ is expressed by the following formula (4) using a principle of resistance voltage division of the first resistor 1034 at this time:

$$\phi = \frac{V_1}{k_1} - \phi_0. \quad (4)$$

When the voltage value V1 measured by the first slider 1035 does not satisfy the formula (3), that is, when the first slider 1035 does not slide on the major arc BOC, the second slider 1037 just slides on an inferior arc EOF of the second resistor 1036. The DC output voltage of the second slider 1037 is measured as V2. The angle $\phi$ measured at this time can be expressed by the following formula (5) using the principle of resistance voltage division on the second resistor 1036:

$$\phi = \frac{V_2}{k_2} - LEOG + \frac{V_{max}}{k_1} - \phi_0. \quad (5)$$

wherein, k2 is an angular voltage division coefficient of the second resistor 103621.

According to a voltage VEOG output by the second slider 1037 at point E, the following formula can be obtained:

$$LEOG = \frac{V_{EOG}}{K_2}.$$

According to the minimum voltage and the maximum voltage output by the first potentiometer 1032, the dead zone of the first potentiometer 1032 is an inferior arc BOC area, and the non-dead zone of the second potentiometer 1033 is set to cover the inferior arc BOC area.

Based on the non-dead zone angle measurement device 10, the method for non-dead zone angle measurement provided by the present disclosure specifically includes:
(1) obtaining ∠AOB and ∠EOG by measurement; and
(2) acquiring the output voltage V1 of the first slider 1035, and determining whether V1 satisfies formula (3); if so, determining the angle $\phi$ according to formula (4); and if not, acquiring the output voltage V2 of the second slider 1037, and then determining the angle $\phi$ according to formula (5).

Embodiment 2

Figure 8:
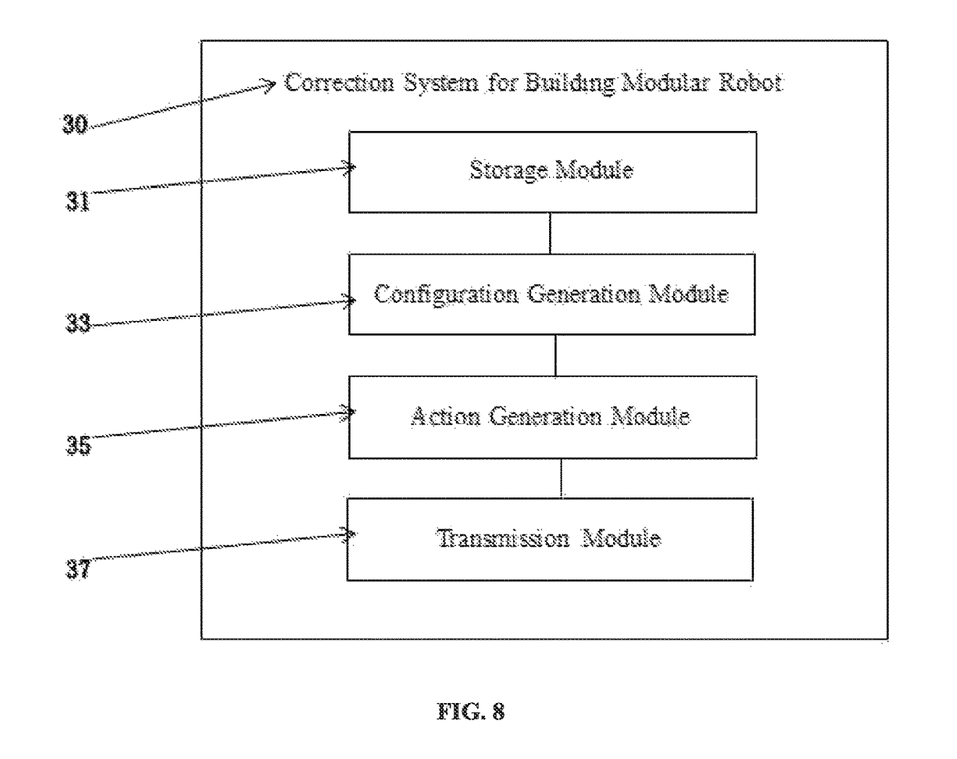
FIG. 8 is a schematic diagram of a module structure of a control system for a modular robot according to a sixth embodiment of the present disclosure.

Referring to FIG. 8, a second embodiment of the present disclosure further provides a control system 30 for a modular robot, which is configured to control an initial entity structure assembled by a plurality of module units. The control system 30 for the modular robot includes:
a storage module 31 configured to store initial virtual configuration information of the initial entity structure;
a configuration generation module 33 configured to generate an initial virtual configuration of the modular robot based on the initial virtual configuration information;
an action generation module 35 configured to generate preset action control information; and
a transmission module 37 configured to transmit the preset action control information to the modular robot, such that the modular robot performs actions according to the preset action control information.

The storage module 31 is connected to the modular robot to store the initial virtual configuration information of the initial entity structure. The configuration generation module 33 is connected to the storage module 31 to acquire the initial virtual configuration information from the storage module 31, thereby generating the initial virtual configuration of the modular robot. The action generation module 35 is connected to the configuration generation module 33 to obtain an initial virtual configuration, and generate the preset action control information according to the initial virtual configuration. The transmission module 37 is connected to the action generation module 35 and the modular robot. The transmission module 37 acquires the preset action control information from the action generation module 35 and transmits the preset action control information to the modular robot. The modular robot performs actions according to the preset action control information.

Embodiment 3

Figure 9:
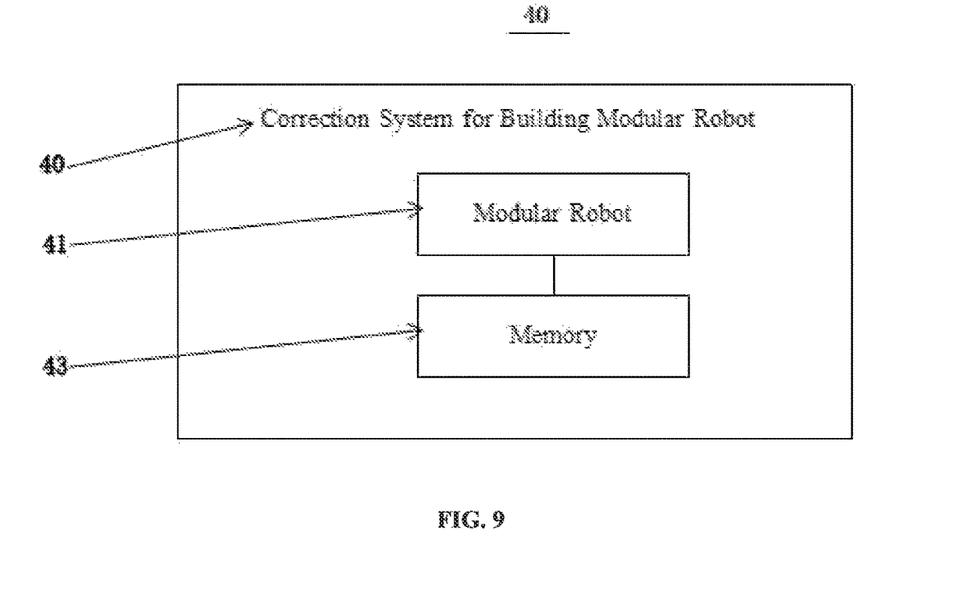
FIG. 9 is a schematic diagram of a module structure of a control system for a modular robot according to a seventh embodiment of the present disclosure.

Referring to FIG. 9, a third embodiment of the present disclosure further provides a control system for a modular robot. The control system for the modular robot includes: a modular robot 41 which is assembled by a plurality of module units and has an initial entity structure; and a memory 43, and one or more programs stored in the memory, wherein the memory communicates with the module units, and the programs are configured to execute the following step instructions:
acquiring and storing initial virtual configuration information of the initial entity structure;
generating an initial virtual configuration of the modular robot based on the initial virtual configuration information;
setting action frames to generate preset action control information; and transmitting the preset action control information to the modular robot.

In addition, the plurality of module units includes a cell body and at least one single cell body. Each docking part has unique interface identification information. The single cell body directly connected to the cell body is defined as a first-level single cell body. Acquiring the initial virtual configuration information of the initial entity structure specifically includes the following steps:

transmitting a signal by the cell body to the first-level single cell body connected thereto through the docking part;

receiving the signal and then performing face recognition by the first-level single cell body to obtain interface identification information of the docking part, that sends a signal, of the cell body; and transmitting, by the first-level single cell body, the interface identification information of the docking part, that sends the signal, of the cell body and the interface identification information of the docking part, that receives the signal, of said first-level single cell body itself to the cell body so as to obtain position information of the first-level single cell body.

Compared with the prior arts, the method for controlling a modular robot includes the following steps: T1: providing a plurality of module units; T2: assembling the plurality of module units into an initial entity structure; T3: acquiring initial virtual configuration information of the initial entity structure; T4: generating an initial virtual configuration based on the initial virtual configuration information; T5: setting an action frame to generate preset action control information; and T6: transmitting the preset action control information to the modular robot which executes a motion according to the preset action control information. The method for controlling a modular robot of the present invention allows users to assemble the configuration at will and programming the control information for controlling the modular robot to perform actions, which greatly improves the convenience for the user of the modular robot, and increases the design space of the modular robot to make it suitable for more using scenes.

In addition, one or more of the rotation time, rotation speed, rotation angle and rotation direction of the motion frame can be edited, and various parameters can be adjusted for the control motion information, which further increases the design space of the modular robot.

In addition, in this method, the position of each module unit can be accurately obtained through face recognition, which is simple, fast and has low hardware requirements.

The system of a control method for a modular robot of the present disclosure also has the above-mentioned advantages.

The foregoing descriptions are merely preferred embodiments of the present disclosure, and are not intended to limit the present disclosure. Within the principles of the present disclosure, any modifications, equivalent substitutions, improvements, etc., are within the protection scope of the present disclosure.

The invention claimed is:

1. A method for controlling a modular robot, wherein the method comprises the following steps:
   T1: providing a plurality of module units;
   T2: assembling the plurality of module units into an initial entity structure;
   T3: acquiring initial virtual configuration information of the initial entity structure;
   T4: generating an initial virtual configuration based on the initial virtual configuration information;
   T5: setting an action frame to generate preset action control information; and
   T6: transmitting the preset action control information to the modular robot which executes a motion according to the preset action control information;
   wherein each of the plurality of module units comprises two sub-modules that are rotatable relative to each other, the initial virtual configuration information comprises one or more of module type information, module quantity information, location information, of the plurality of module units, and initial angle information between the two sub-modules;
   wherein the plurality of module units comprises a plurality of identical or different module units, each of the sub-modules comprises at least one docking part, each of the docking parts has unique interface identification information; and acquiring the location information of the plurality of module units of the initial entity structure specifically comprises:
   recognizing, by a module unit, the interface identification information of the docking part of an adjacent module unit connected to the module unit, and acquiring the location information of the module unit according to the interface identification information of the docking part of the adjacent module unit and the interface identification information of the docking part of the module unit per se for connecting the adjacent module unit.

2. The method for controlling the modular robot according to claim 1, wherein step T5 specifically comprises the following sub-steps:
   T51: controlling the two sub-modules of one or more module units to rotate relative to each other to generate one or more motion frames;
   T52: storing the one or more motion frames; and
   T53: generating preset action control information according to the one or more motion frames.

3. The method for controlling the modular robot according to claim 2, wherein in step T51, the two sub-modules of the one or more module units in the initial entity structure are controlled to rotate relative to each other, or the two sub-modules of the one or more module units in the initial virtual configuration are controlled to rotate relative to each other.

4. The method for controlling the modular robot according to claim 2, wherein step T53 specifically comprises:
   adding, deleting or editing the one or more motion frames to generate the preset action control information.

5. The method for controlling the modular robot according to claim 4, wherein editing the action frame comprises editing one or more of a rotation time, a rotation speed, a rotation angle and a rotation direction.

6. The method for controlling the modular robot according to claim 1, wherein the plurality of module units comprises at least one module unit capable of communicating with a remote terminal; when the plurality of module units comprises a plurality of different module units, the plurality of module units comprise a cell body and at least one single cell body; the module unit communicating with the remote terminal is defined as the cell body; the single cell body directly connected to the cell body is defined as a first-level single cell body; and acquiring the location information of the plurality of module units of the initial entity structure specifically comprises the following sub-steps:
   T31: transmitting a signal by the cell body to the first-level single cell body connected thereto via the docking part; and
   T32: receiving the signal and then performing face recognition by the first-level single cell body to obtain the interface identification information of the docking part where the cell body transmits the signal, and transmitting the interface identification information of the docking part where the cell body transmits the signal together with the interface identification information of the docking part where the first-level single cell body per se receives the signal to the cell body by the first-level single cell body, so as to obtain the location information of the first-level single cell body.

7. The method for controlling the modular robot according to claim 6, wherein the single cell body connected to the first-level single cell body is defined as a second-level single cell body; the single cell body connected to an $M^{th}$-level single cell body is defined as a $(M+1)^{th}$-level single cell body, M being an integer greater than or equal to 1; and acquiring the location information of the plurality of module units of the initial entity structure further comprises the following sub-steps:

T33: sending a signal to the $(M+1)^{th}$-level single cell body by the $M^{th}$-level single cell body;

T34: receiving the signal and then performing face recognition by the $(M+1)^{th}$-level single cell body to obtain the interface identification information of the docking part where the $M^{th}$-level single cell body transmits the signal, and transmitting the interface identification information of the docking part where the $M^{th}$-level single cell body transmits the signal together with the interface identification information of the docking part where the $(M+1)^{th}$-level single cell body receives the signal to the main cell body by the $(M+1)^{th}$-level single cell body.

8. The method for controlling the modular robot according to claim 7, wherein when the cell body or the single cell body sends different electrical signals simultaneously to a plurality of lower-level single cell bodies, the plurality of lower-level single cell bodies responds to the cell body with the location information of the lower-level single cell bodies in a time-sharing sequence according to the interface identification information of the docking part where the cell body or an lower-level single cell body sends the different electrical signals; or, when the cell body or the single cell body sends identical or different electrical signals to the plurality of lower-level single cell bodies in a time-sharing sequence, the plurality of lower-level single cell bodies responds to the cell body with the location information of the lower-level single cell bodies successively according to a time sequence in which the electrical signals are received.

9. The method for controlling the modular robot according to claim 1, wherein each single cell body monitors relative angle information between the two sub-modules of the single cell body in real time during the execution of an action, and judges whether the action is completely executed according to a detection result.

10. A system for controlling a modular robot, wherein the system comprises:

a modular robot which is assembled from a plurality of module units and has an initial entity structure;

a memory and one or more programs, wherein the one or more programs are stored in the memory, the memory communicates with the module units, and the one or more programs are configured to execute the following step instructions:

acquiring and storing initial virtual configuration information of the initial entity structure;

generating an initial virtual configuration of the modular robot according to the initial virtual configuration information;

setting an action frame to generate preset action control information; and transmitting the preset action control information to the modular robot;

wherein the plurality of module units comprises the cell body and at least one single cell body; each docking part has unique interface identification information; the single cell body directly connected to the cell body is defined as a first-level single cell body; and acquiring the initial virtual configuration information of the initial entity structure comprises the following steps:

transmitting a signal by the cell body to the first-level single cell body connected thereto via the docking part; and receiving the signal and then performing face recognition by the first-level single cell body to obtain the interface identification information of the docking part where the cell body transmits the signal, and transmitting the interface identification information of the docking part where the cell body transmits the signal together with the interface identification information of the docking part where the first-level single cell body per se receives the signal to the cell body by the first-level single cell body, so as to obtain the location information of the first-level single cell body.

* * * * *